US012583600B2

(12) United States Patent
Czapla et al.

(10) Patent No.: US 12,583,600 B2
(45) Date of Patent: Mar. 24, 2026

(54) AIRCRAFT PROPULSION UNIT COMPRISING AT LEAST ONE PRESSURE RELIEF DEVICE AND AIRCRAFT HAVING AT LEAST ONE SUCH PROPULSION UNIT

(71) Applicants:Airbus SAS, Blagnac (FR); Airbus Operations SAS, Toulouse (FR)

(72) Inventors: Lionel Czapla, Toulouse (FR); Alexis Pissavin, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 23 days.

(21) Appl. No.: 18/581,718

(22) Filed: Feb. 20, 2024

(65) Prior Publication Data

US 2024/0278922 A1 Aug. 22, 2024

(30) Foreign Application Priority Data

Feb. 22, 2023 (FR) ...................................... 2301620

(51) Int. Cl.
| | |
|---|---|
| *B64D 29/06* | (2006.01) |
| *B64C 1/14* | (2006.01) |
| *B64C 1/00* | (2006.01) |
| *B64D 37/24* | (2006.01) |
| *B64D 37/32* | (2006.01) |

(52) U.S. Cl.
CPC ............ *B64D 29/06* (2013.01); *B64C 1/1407* (2013.01); *B64C 2001/009* (2013.01); *B64C 1/14* (2013.01); *B64D 37/24* (2013.01); *B64D 37/32* (2013.01)

(58) Field of Classification Search
CPC ...... B64D 29/06; B64D 29/00; B64D 1/1407; B64D 37/32; B64D 37/24; B64C 1/14; B64C 2001/009; B64C 1/1407
See application file for complete search history.

(56) References Cited

U.S. PATENT DOCUMENTS

| | | | | |
|---|---|---|---|---|
| 4,825,644 A | * | 5/1989 | Bubello | B64D 29/00 60/39.83 |
| 6,131,855 A | * | 10/2000 | Porte | B64D 29/00 244/134 B |
| 2011/0240137 A1 | * | 10/2011 | Vauchel | B64D 29/00 137/15.2 |
| 2011/0297787 A1 | * | 12/2011 | Guillaume | B64D 29/06 49/31 |
| 2013/0043350 A1 | | 2/2013 | Defrance et al. | |
| 2017/0144745 A1 | * | 5/2017 | Schneider | B64C 1/18 |
| 2020/0130811 A1 | * | 4/2020 | Crawford | B64C 7/02 |
| 2020/0224462 A1 | * | 7/2020 | Renner | E05B 47/026 |
| 2022/0289396 A1 | | 9/2022 | Horde et al. | |
| 2022/0402622 A1 | | 12/2022 | Villanueva et al. | |

OTHER PUBLICATIONS

French Search Report and Written Opinion for corresponding French Patent Application No. 2301620 dated Aug. 18, 2023.

* cited by examiner

*Primary Examiner* — Thomas P Burke

(74) *Attorney, Agent, or Firm* — Greer Burns & Crain Ltd.

(57) ABSTRACT

An aircraft propulsion unit comprising a motor, a system for supplying fuel to the motor, a fairing inside which the motor and at least part of the fuel supplying system are positioned, and at least one pressure relief device configured to establish communication between the inner and outer zones of the fairing when the pressure in the inner zone is greater than or equal to a given threshold or when a leak is detected. Also an aircraft comprising at least one such propulsion unit.

10 Claims, 6 Drawing Sheets

AIRCRAFT PROPULSION UNIT COMPRISING AT LEAST ONE PRESSURE RELIEF DEVICE AND AIRCRAFT HAVING AT LEAST ONE SUCH PROPULSION UNIT

CROSS-REFERENCES TO RELATED APPLICATIONS

This application claims the benefit of French Patent Application Number 2301620 filed on Feb. 22, 2023, the entire disclosure of which is incorporated herein by way of reference.

FIELD OF THE INVENTION

The present application relates to an aircraft propulsion unit comprising at least one pressure relief device and to an aircraft having at least one such propulsion unit.

BACKGROUND OF THE INVENTION

According to an embodiment shown in FIG. 1, an aircraft 10 comprises a fuselage 12, wings 14 that extend on either side of the fuselage, and propulsion units 16 connected to the wings 14 and positioned below the wings 14. According to a configuration shown in FIG. 2, a propulsion unit 16 comprises a turboprop engine 18, a propeller 20 driven in rotation by the turboprop engine 18, and a nacelle 22 in which the turboprop engine 18 is positioned, the propeller 20 being positioned at the front and on the outside of the nacelle 22.

In one configuration, since the turboprop engine 18 is hydrogen powered, the aircraft 10 comprises a hydrogen supplying system 24. Since the hydrogen is stored in the cryogenic state, the hydrogen supplying system 24 is configured to compress the hydrogen to a very high pressure, vaporize it, and then reheat it before supplying it to the turboprop engine 18.

In the event of incidents, the hydrogen supplying system 24 can generate a rapid rise in pressure inside the nacelle 22. In order to withstand such excess pressure, the nacelle 22 is reinforced. This solution is not satisfactory because it has the effect of significantly increasing the mass of the nacelle 22.

SUMMARY OF THE INVENTION

The present invention aims to overcome all or some of the drawbacks of the prior art.

To this end, the invention relates to an aircraft propulsion unit comprising a motor, a fuel supplying system configured to supply fuel to the motor, and a fairing that separates an inner zone and an outer zone, the motor and at least part of the fuel supplying system being positioned in the inner zone.

According to the invention, the propulsion unit comprises a pressure relief device configured to assume an inactivated state, when the inner zone exhibits a pressure lower than a given threshold, in which the pressure relief device forms a substantially leaktight barrier between the inner and outer zones, and an activated state, when the inner zone exhibits a pressure greater than or equal to the given threshold, in which the pressure relief device makes it possible to establish communication between the inner and outer zones.

According to the invention, it is not necessary to reinforce the fairing to withstand any excess pressure inside it. The activation of the pressure relief device makes it possible to establish communication between the inside and the outside of the fairing in the event of excess pressure, thus limiting the risks of damage to the fairing.

According to another feature, the pressure relief device comprises:

a. at least one opening, which passes through the fairing and establishes communication between the inner and outer zones, b. for each opening, at least one door configured to assume a closed position, corresponding to the inactivated state of the pressure relief device, in which the door closes off the opening, and an open position, corresponding to the activated state of the pressure relief device, in which the door at least partially uncovers the opening, c. for each door, at least one articulation connecting the door and a fixed part of the propulsion unit, d. at least one locking/unlocking system configured to assume a locked state, in which the locking/unlocking system keeps the door in the closed position, and an unlocked state, in which the locking/unlocking system allows the door to move from the closed position to the open position.

According to another feature, each locking/unlocking system is configured to automatically move from the locked state to the unlocked state as soon as the pressure in the inner zone becomes greater than or equal to the given threshold.

According to another feature, the pressure relief device comprises a controller configured to bring about a change in state of the locking/unlocking system.

According to another feature, the pressure relief device comprises, for each door, at least one actuator connected to the door and configured to bring about a change in position of the door.

According to another feature, the articulation is configured such that the door is moved away from the fairing in the direction of the outer zone when the door moves from the closed position to the open position, the articulation having a pivot axis positioned approximately in a transverse plane at the front of the door.

According to another feature, the pressure relief device comprises, for each door, at least one retaining means connecting the door to a fixed part of the propulsion unit.

According to another feature, the pressure relief device comprises at least one seal interposed between the fairing and each door when the latter is in the closed position.

According to another feature, the fairing comprises first and second lateral walls and a trailing edge at which the lateral walls meet. According to this configuration, the opening of the pressure relief device is positioned in at least one of the first and second lateral walls and extends to the trailing edge.

According to another feature, the opening of the pressure relief device is positioned in the first and second lateral walls and the pressure relief device comprises a first door which extends the first lateral wall and a second door which extends the second lateral wall.

According to another feature, the fairing comprises first and second lateral walls, a trailing edge at which the first and second lateral walls meet, and an upper wall which connects the first and second lateral walls and extends to the trailing edge. According to this configuration, the opening of the pressure relief device is positioned in the upper wall and extends to the trailing edge.

Another subject of the invention is an aircraft comprising at least one propulsion unit according to one of the features above.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 1:
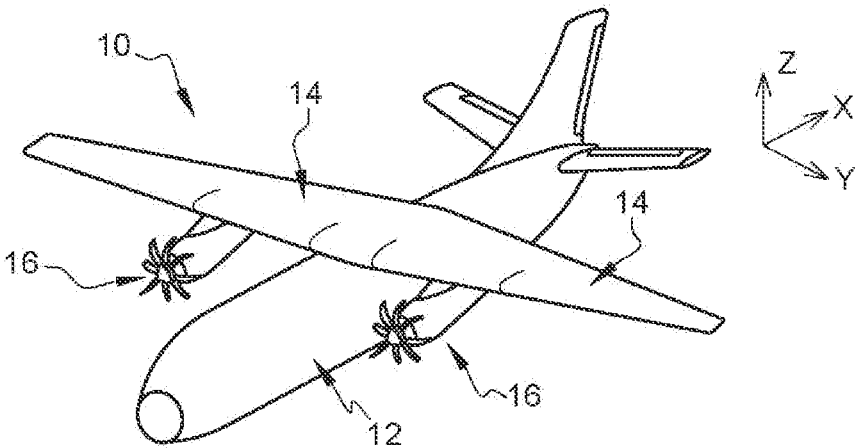
FIG. 1 is a perspective view of an aircraft.
Figure 2:
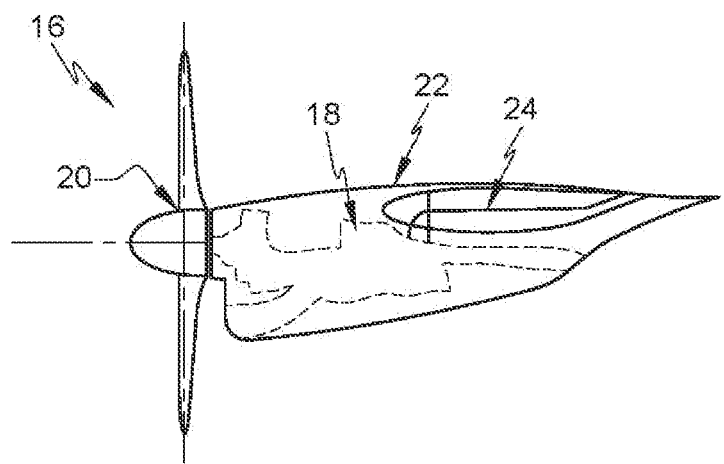
FIG. 2 is a side view of a propulsion unit illustrating one embodiment of the prior art.
Figure 3:
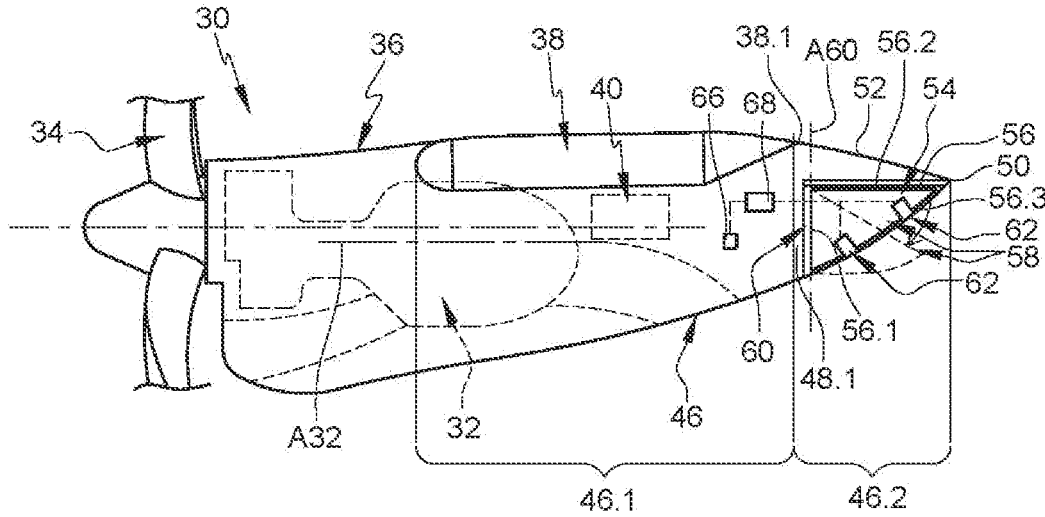
FIG. 3 is a side view of a propulsion unit illustrating a first embodiment of the invention.

According to a configuration shown in FIG. 3, a propulsion unit 30 comprises a motor 32, a propeller 34 driven in rotation by the motor 32, and a nacelle 36 which forms an aerodynamic fairing around the motor 32, the propeller 34 being positioned on the outside and at the front of the nacelle 36.

The motor 32 comprises an axis of rotation A32 substantially parallel to that of the propeller 34.

For the remainder of the description, a longitudinal direction is a direction parallel to the axis of rotation A32 of the motor 32. A transverse plane is a plane perpendicular to the axis of rotation A32 of the motor 32. The concepts "front" and "rear" refer to the direction of flow of the air around the motor 32 in flight, the air flowing from the front to the rear.

In one application, an aircraft comprises at least one propulsion unit 30 which is positioned below a wing 38 of the aircraft and connected to this wing.

Of course, the invention is not restricted to this application or to this positioning for the propulsion unit 30.

Fuel is supplied to the propulsion unit 30 by a fuel supplying system 40 positioned partly in the nacelle 36. In one configuration, the fuel is in gaseous form and the fuel supplying system is therefore a gaseous fuel supplying system. In another configuration, the fuel is in liquid cryogenic form and the fuel supplying system 40 is therefore a liquid cryogenic fuel supplying system.

In one configuration, with the propulsion unit being hydrogen powered, the fuel supplying system 40 comprises at least one element from the following: a high-pressure pump, a vaporization system, a heat exchanger, ducts, shutoff valves and buffer tanks. Of course, this list is not exhaustive. In addition, the invention is not restricted to hydrogen as fuel.

The nacelle 36 comprises a primary structure which, among other things, reacts forces and a secondary structure, which is in the form of an aerodynamic fairing 46 and is supported by the primary structure.

This fairing 46 comprises an assembly of juxtaposed walls each having one face in contact with a stream of air when the aircraft is in flight.

According to one embodiment, the fairing 46 comprises a central part 46.1 positioned below the wing 38 and a rear part 46.2 which is offset to the rear in relation to a vertical plane passing through the trailing edge 38.1 of the wing 38.

According to another embodiment, the fairing 46 does not comprise a part which is offset to the rear in relation to a vertical plane passing through the trailing edge 38.1 of the wing 38.

In one configuration, the fairing 46 comprises first and second lateral walls 48.1, 48.2 and a trailing edge 50 positioned at the rear end of the fairing 46, the lateral walls 48.1, 48.2 meeting at the trailing edge 50. If there is a rear part 46.2 (at the rear of the wing 38), the fairing 46 comprises an upper wall 52 which is positioned in a substantially horizontal plane, connects the first and second lateral walls 48.1, 48.2, and extends to the trailing edge 50.

The first and second lateral walls 48.1, 48.2 are substantially symmetrical with respect to a substantially vertical median plane PM (visible in FIG. 4) containing the trailing edge 50.

According to an embodiment shown in the various FIGS. 3 to 11, the first and second lateral walls 48.1, 48.2 form, in a transverse plane, an approximate V shape with a point pointing downwards, the trailing edge 50 extending to the central part 46.1 of the fairing 46. According to another embodiment shown in FIG. 12, the trailing edge 50 is substantially vertical and the fairing 46 comprises a lower wall 52' connecting the first and second lateral walls 48.1, 48.2 as far as the trailing edge 50.

Irrespective of its configuration, the fairing 46 separates an inner zone and an outer zone, the motor 32 and at least part of the fuel supplying system 40 being positioned in the inner zone.

According to one feature of the invention, the propulsion unit 30 comprises a pressure relief device 54 configured to assume an inactivated state, when the inner zone exhibits a pressure lower than a given threshold, in which the pressure relief device 54 forms a substantially fluid-tight barrier between the inner and outer zones, and an activated state, when the inner zone exhibits a pressure greater than or equal to the given threshold, in which the pressure relief device 54 makes it possible to establish communication between the inner and outer zones.

The pressure relief device 54 comprises at least one opening 56, which passes through the fairing 46 and makes it possible to establish communication between the inner and outer zones, and, for each opening 56, at least one door 58 configured to assume a closed position, corresponding to the inactivated state of the pressure relief device 54, in which the door 58 closes off the opening 56, and an open position, corresponding to the activated state of the pressure relief device 54, in which the door 58 at least partially uncovers the opening 56.

Each door 58 extends in the continuation of the fairing 46 so as to limit aerodynamic disturbances.

In addition, the pressure relief device 54 comprises, for each door 58, at least one articulation 60 connecting the door 58 and a fixed part of the propulsion unit 30, such as the primary or secondary structure of the nacelle 36, and at least one locking/unlocking system 62 which is at a spacing from the articulation 60 and is configured to assume a locked state, in which the locking/unlocking system 62 keeps the door 58 in the closed position, and an unlocked state, in which the locking/unlocking system allows the door 58 to move from the closed position to the open position. In one configuration, the locking/unlocking system 62 is disposed at the end of the door 58 opposite the articulation 60.

According to one embodiment, the articulation 60 is configured such that the door 58 is moved away from the fairing 46 in the direction of the outer zone when it moves from the closed position to the open position.

In one configuration, each articulation 60 comprises multiple hinges of the gooseneck type. In another configuration, each articulation 60 comprises multiple hinges of the continuous type.

In one arrangement, for each door 58, the articulation 60 has a pivot axis A60 positioned approximately (i.e., +/−10 degrees) in a transverse plane at the front of the door 58. This arrangement makes it possible to avoid a stream of air that flows around the fairing 46 in flight forcing the door 58 to open.

According to one embodiment, the pressure relief device 54 comprises, for each door 58, at least one retaining means 64, such as a cable, which connects the door 58 to a fixed part of the propulsion unit and limits the opening of the door 58 beyond the open position. The retaining means 64 makes it possible to limit the opening of the door 58 to a predetermined passage section.

Each retaining means 64 has a first end 64.1, which is connected to the door 58 and is at a spacing from the articulation 60, and a second end 64.2, which is connected to the nacelle 36, notably to its primary or secondary structure, and is at a spacing from the articulation 60.

In one configuration, each locking/unlocking system 62 is configured so as to automatically move from the locked state to the unlocked state as soon as the pressure in the inner zone becomes greater than or equal to the given threshold.

In another configuration, each locking/unlocking system 62 is controllable. According to one embodiment, the pressure relief device 54 comprises at least one dihydrogen leak detector taking the form, for example, of a dihydrogen detector, configured to detect the presence of dihydrogen in the inner zone of the fairing 46, or a pressure sensor 66, positioned in the inner zone and configured to measure a pressure in the inner zone, and a controller 68, provided with information by the leakage sensor or the pressure sensor 66 and configured to control each locking/unlocking system 62 and command a change in the state of each locking/unlocking system 62 from the locked state to the unlocked state as soon as the pressure measured by the pressure sensor 66 is greater than or equal to the given threshold or when a leak is detected. In addition or alternatively, the pressure relief device 54 comprises a controller which is actuatable by a person, such as the pilot, stationed in the cockpit, and is configured to bring about a change in state of the pressure relief system.

The pressure relief device 54 may comprise, for each door 58, at least one actuator connected to the door and configured to bring about a change in position of the door 58.

In one arrangement, the pressure relief device 54 comprises at least one seal 70 interposed between the fairing 46 and each door 58 when the latter is in the closed position.

Figure 4:
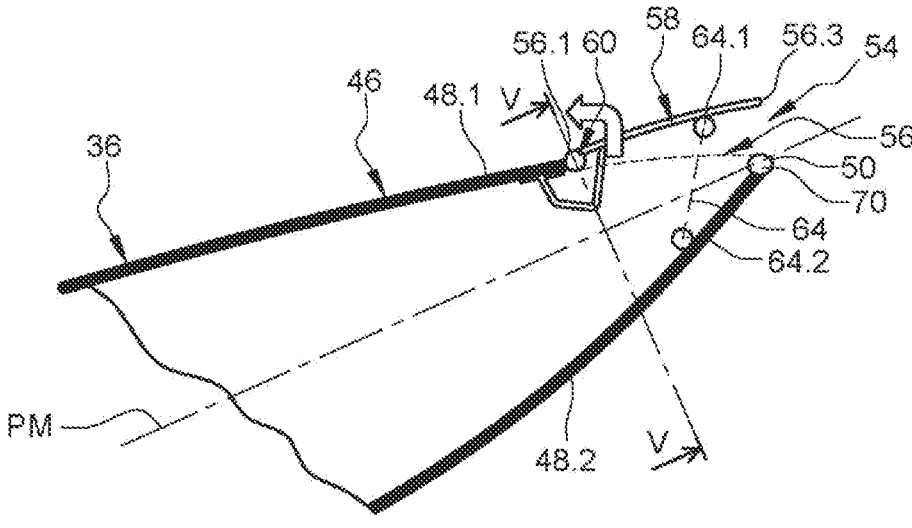
FIG. 4 is a schematic top view of part of the fairing of the propulsion unit shown in FIG. 3.
Figure 5:
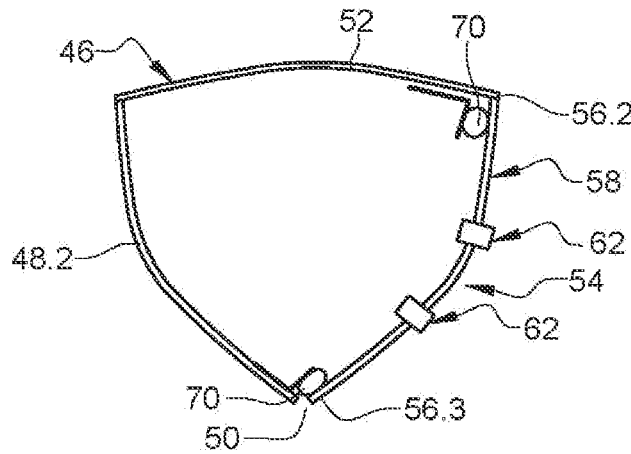
FIG. 5 is a schematic section on the line V-V in FIG. 4.

According to a first embodiment shown in FIGS. 3 to 5, the opening 56 is positioned in the first lateral wall 48.1. The opening 56 is delimited by a substantially vertical first edge 56.1 which is positioned at the front of the opening 56 and extends to the trailing edge 50, a substantially horizontal second edge 56.2 which connects the first edge 56.1 and the trailing edge 50, and a third edge 56.3 which follows the trailing edge 50 and connects the first and second edges 56.1, 56.2. In one configuration, the second edge 56.2 follows the junction zone which connects the first lateral wall 48.1 and the upper wall 52.

According to this first embodiment, the pressure relief device 54 comprises a single door 58 delimited by first, second and third sides which, when the door 58 is in the closed position, follow the first, second and third edges 56.1, 56.2, 56.3, respectively, of the opening 56.

The articulation 60 is positioned at the first edge 56.1 of the opening 56. The pressure relief device 54 comprises two locking/unlocking systems 62 distributed over the third edge 56.3 of the opening 56. At least one seal 70 is connected to the nacelle 36, notably to its primary or secondary structure, and extends along the second and third edges 56.2, 56.3.

Figure 6:
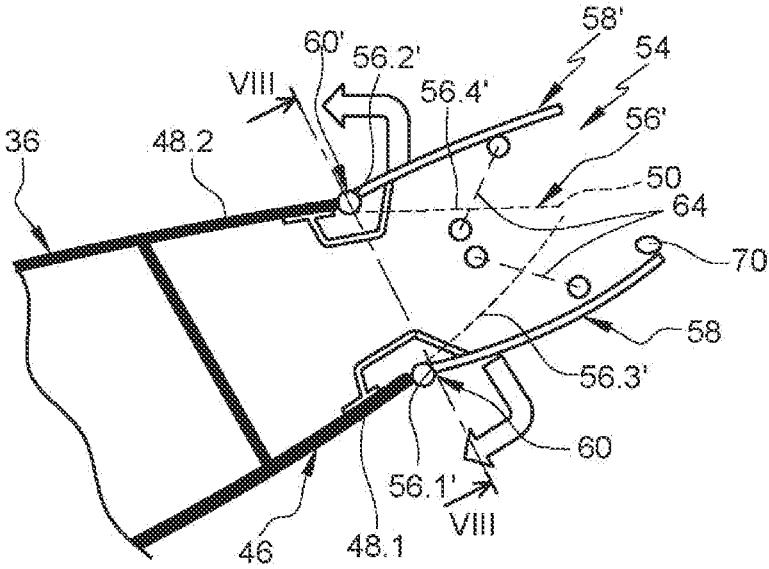
FIG. 6 is a schematic top view of part of a fairing of a propulsion unit illustrating another embodiment of the invention.
Figure 8:
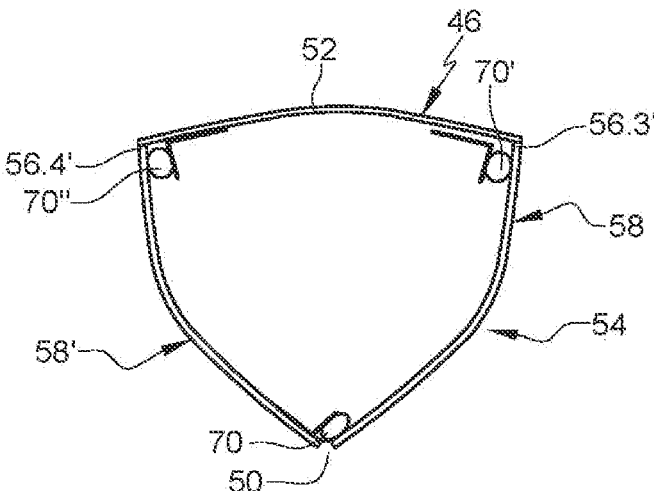
FIG. 8 is a schematic section on the line VIII-VIII in FIG. 6.

According to a second embodiment shown in FIGS. 6 and 8, the opening 56' is positioned in the first and second lateral walls 48.1, 48.2. The opening 56' is delimited by:

e. a first edge 56.1', which extends along the first lateral wall 48.1 and connects the trailing edge 50 and the upper wall 52, f. a second edge 56.2', which extends along the second lateral wall 48.2 and connects the trailing edge 50 and the upper wall 52, the first and second edges 56.1', 56.2' being positioned in the same transverse plane, g. a third edge 56.3', which connects the first edge 56.1' and the trailing edge 50 and is positioned at the junction zone connecting the first lateral wall 48.1 and the upper wall 52, h. a fourth edge 56.4', which connects the second edge 56.2' and the trailing edge 50 and is positioned at the junction zone connecting the second lateral wall 48.2 and the upper wall 52.

According to this second embodiment, the pressure relief device 54 comprises first and second doors 58, 58' which extend the first and second lateral walls 48.1, 48.2, respectively. The first door 58 comprises first, second and third sides which, when the first door 58 is in the closed position, follow the first edge 56.1', the third edge 56.3' and the trailing edge 50, respectively, of the opening 56'. The second door 58' comprises first, second and third sides which, when the second door 58' is in the closed position, follow the second edge 56.2', the fourth edge 56.4' and the trailing edge 50, respectively, of the opening 56'.

According to this second embodiment, the pressure relief device 54 comprises at least one first articulation 60 connecting the first door 58 to the first edge 56.1' of the opening 56' and at least one second articulation 60' connecting the second door 58' to the second edge 56.2' of the opening 56'.

The pressure relief device 54 comprises locking/unlocking systems 62 distributed over the third sides of the first and second doors 58, 58', which are located at the trailing edge 50 when they are in the closed position. In addition, the pressure relief device 54 comprises a first seal 70 which is positioned on the third side of the first door 58 and is interposed between the first and second doors 58, 58' when they are in the closed position, a second seal 70' which is positioned at the third edge 56.3' of the opening 56' and is interposed between the first door 58 and the nacelle 36, and a third seal 70'' which is positioned at the fourth edge 56.4' of the opening 56' and interposed between the second door 58' and the nacelle 36.

7

Figure 7:
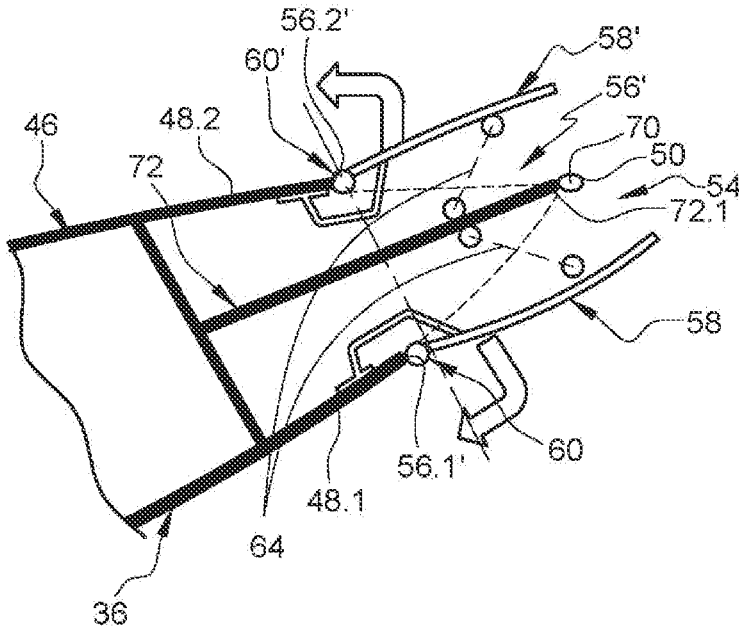
FIG. 7 is a schematic top view of part of a fairing of a propulsion unit illustrating another embodiment of the invention.

According to a third embodiment shown in FIG. 7, which is similar to that shown in FIG. 6, the pressure relief device 54 comprises an opening 56' and first and second doors 58, 58' which are substantially identical to those of the second embodiment. In addition, the nacelle comprises a median reinforcement 72 having a rear edge 72.1 which follows the trailing edge 50 and against which the first and second doors 58, 58' bear in the closed position. According to this third embodiment, the first seal 70 is connected to the median reinforcement 72 and not to the first door 58.

Figure 9:
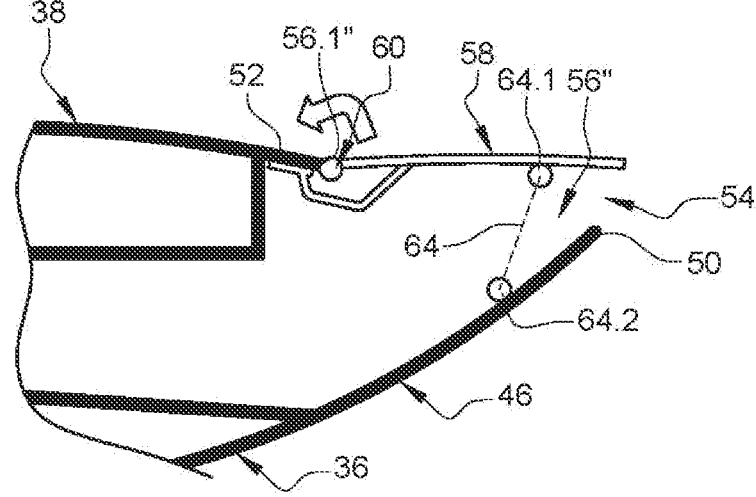
FIG. 9 is a schematic side view of part of a fairing of a propulsion unit illustrating another embodiment of the invention.
Figure 10:
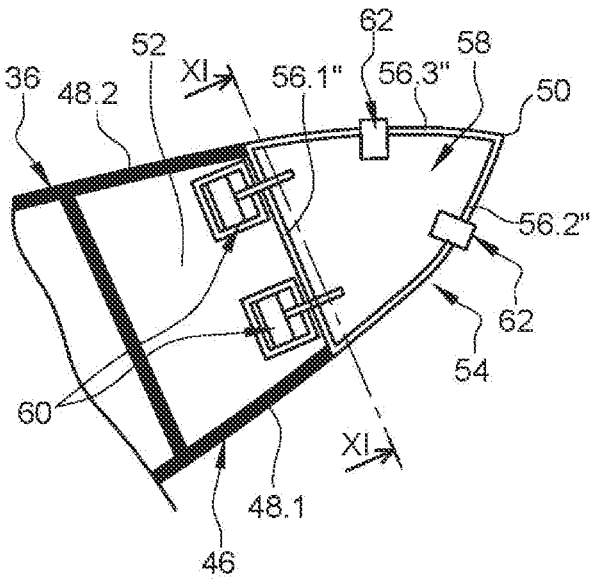
FIG. 10 is a schematic top view of part of the fairing shown in FIG. 9.
Figure 11:
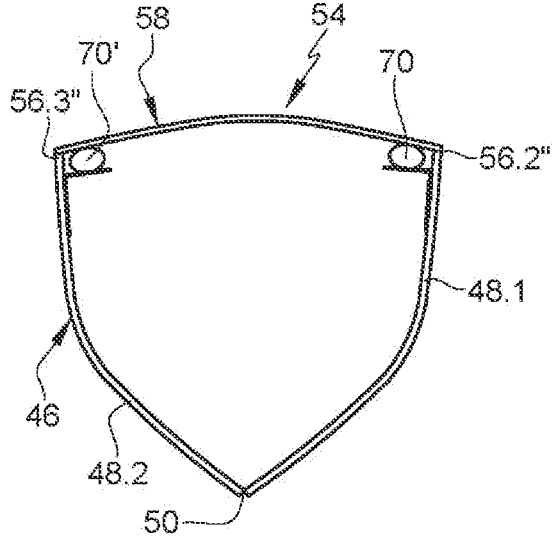
FIG. 11 is a schematic section on the line XI-XI in FIG. 10.

According to a fourth embodiment shown in FIGS. 9 to 11, the opening 56" is positioned in the upper wall 52. It is delimited by a first edge 56.1" positioned in a transverse plane connecting the junction zones that connect the upper wall 52 and the first and second lateral walls 48.1, 48.2, a second edge 56.2" which follows the junction zone connecting the upper wall 52 and the first lateral wall 48.1 and extends from the first edge 56.1" to the trailing edge 50, and a third edge 56.3" which follows the junction zone connecting the upper wall 52 and the second lateral wall 48.2 and extends from the first edge 56.1" to the trailing edge 50.

According to this fourth embodiment, the pressure relief device 54 comprises a single door 58 delimited by first, second and third sides which, when the door 58 is in the closed position, follow the first, second and third edges 56.1", 56.2", 56.3", respectively, of the opening 56".

The articulation 60 is positioned at the first edge 56.1" of the opening 56". The pressure relief device 54 comprises at least first and second locking/unlocking systems 62, 62', at least a first locking/unlocking system 62 being positioned at the second edge 56.2" of the opening 56" and at least a second locking/unlocking system 62' being positioned at the third edge 56.3" of the opening 56". According to this fourth embodiment, the pressure relief device 54 comprises a first seal 70, which is connected to the nacelle 36 and extends along the second edge 56.2" of the opening 56", and a second seal 70', which is connected to the nacelle 36 and extends along the third edge 56.3".

Figure 12:
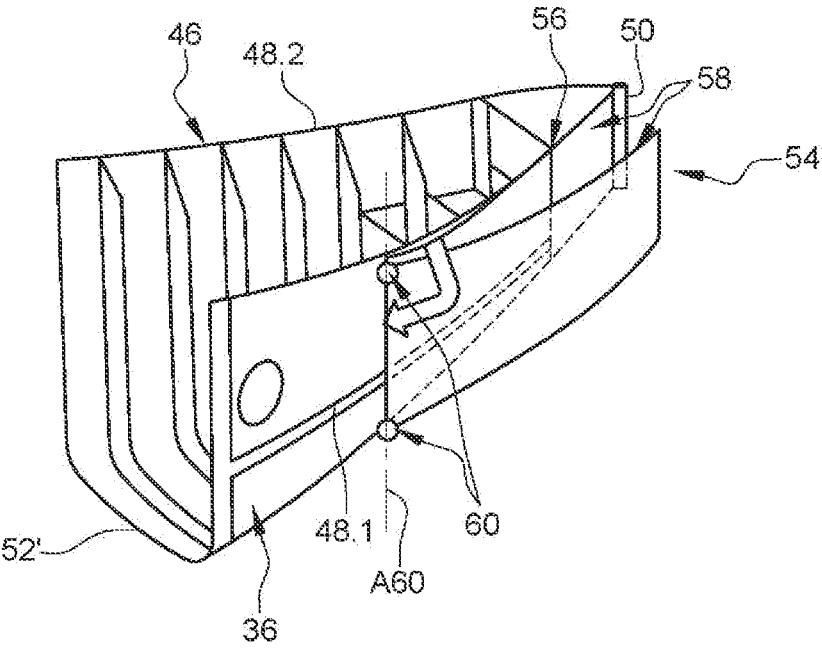
FIG. 12 is a schematic perspective view of part of a fairing of a propulsion unit illustrating another embodiment of the invention.

Of course, the invention is not limited to the embodiments described above. Thus, as illustrated in FIG. 12, the opening 56 and the door 58 may each have more than three edges or sides and have different geometries.

Irrespective of the embodiment, the opening 56 should have a surface area which is sufficient, i.e., greater than 500 cm², for example in the region of 4000 cm², to limit the risks of damage to the fairing 46 in the event of an excess pressure inside the fairing.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion unit comprising:
   a motor,
   a fuel supplying system configured to supply fuel to the motor, a fairing that separates an inner zone and an outer zone, the motor and at least part of the fuel supplying system being positioned in the inner zone, and a pressure relief device configured to assume an inactivated state when the inner zone exhibits a pressure lower than a given threshold, in which the pressure relief device forms a leaktight barrier between the inner zone and the outer zone, and an activated state when the inner zone exhibits a pressure greater than or equal to the given threshold, in which the pressure relief device is configured to establish communication between the inner zone and the outer zone, wherein the pressure relief device comprises at least one opening passing through the fairing to establish communication between the inner zone and the outer zone and, for each of the at least one opening, at least one door configured to assume a closed position, corresponding to the inactivated state of the pressure relief device, in which the at least one door closes off the at least one opening, and an open position, corresponding to the activated state of the pressure relief device, in which the at least one door at least partially uncovers the at least one opening, wherein the fairing comprises a first lateral wall, a second lateral wall, and a trailing edge at which the first and second lateral walls meet, wherein the at least one opening of the pressure relief device is positioned in either the first lateral wall, the second lateral wall, or both, and wherein the at least one opening of the pressure relief device extends to the trailing edge, and wherein the first lateral wall and the second lateral wall form, in a transverse plane, an approximate V-shape, such that the trailing edge forms an end point of the approximate V-shape, and the trailing edge extends to a central part of the fairing.

2. The aircraft propulsion unit according to claim 1, wherein the pressure relief device comprises, for each of the at least one door, at least one articulation connecting the at least one door to a fixed part of the aircraft propulsion unit, and at least one locking/unlocking system configured to assume a locked state, in which the at least one locking/ unlocking system keeps the at least one door in the closed position, and an unlocked state, in which the at least one locking/unlocking system allows the at least one door to move from the closed position to the open position.

3. The aircraft propulsion unit according to claim 2, wherein each of the at least one locking/unlocking system is configured to automatically move from the locked state to the unlocked state as soon as the pressure in the inner zone becomes greater than or equal to the given threshold.

4. The aircraft propulsion unit according to claim 2, wherein the pressure relief device comprises a controller configured to bring about a change in state of the at least one locking/unlocking system.

5. The aircraft propulsion unit according to claim 4, wherein the pressure relief device comprises, for each of the at least one door, at least one actuator connected to the at least one door and configured to bring about a change in position of the at least one door.

6. The aircraft propulsion unit according to claim 2, wherein the articulation is configured such that the at least one door is moved away from the fairing in a direction of the outer zone when the at least one door moves from the closed position to the open position, the at least one articulation having a pivot axis positioned approximately in a transverse plane at the front of the at least one door.

7. The aircraft propulsion unit according to claim 1, wherein the pressure relief device comprises, for each of the at least one door, at least one retaining means connecting the at least one door to a fixed part of the aircraft propulsion unit.

8. The aircraft propulsion unit according to claim 1, wherein the pressure relief device comprises at least one seal interposed between the fairing and each of the at least one door when the at least one door is in the closed position.

9. The aircraft propulsion unit according to claim 1, wherein the pressure relief device comprises a first door in the first lateral wall and a second door in the second lateral wall.

10. As aircraft comprising:

at least one aircraft propulsion unit according to claim 1.

* * * * *